United States Patent
Wang et al.

(10) Patent No.: US 10,282,673 B2
(45) Date of Patent: May 7, 2019

(54) DATA CORRELATION PROCESSING METHOD BASED ON OBSERVATION DATA FROM BEIDOU SATELLITE

(71) Applicant: Beihang University, Beijing (CN)

(72) Inventors: Zhipeng Wang, Beijing (CN); Yanbo Zhu, Beijing (CN); Sikun Wang, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 30 days.

(21) Appl. No.: 15/788,117

(22) Filed: Oct. 19, 2017

(65) Prior Publication Data

US 2019/0080261 A1    Mar. 14, 2019

(30) Foreign Application Priority Data

Sep. 14, 2017   (CN) .......................... 2017 1 0825314

(51) Int. Cl.
*G06N 20/00*    (2019.01)
*G06N 5/04*    (2006.01)
*G01S 19/23*    (2010.01)

(52) U.S. Cl.
CPC ............. *G06N 20/00* (2019.01); *G06N 5/048* (2013.01); *G01S 19/23* (2013.01)

(58) Field of Classification Search
None
See application file for complete search history.

(56) References Cited

U.S. PATENT DOCUMENTS

| 2003/0065409 A1* | 4/2003 | Raeth ...................... G05B 9/02 700/31 |
| 2017/0212246 A1* | 7/2017 | Houchi .................. G01S 19/30 |
| 2017/0220711 A1* | 8/2017 | Yoshida ............. G06F 17/5009 |

OTHER PUBLICATIONS

Lin et al. "Fuzzy Support Vector Machines", IEEE Transaction NN, 2002, 464-471.*
Guang et al. "The Research on Carrier Phase Time Transfer of BeiDou Navigation Satellite System", IEEE, 2014, pp. 113-117.*

* cited by examiner

*Primary Examiner* — Li Wu Chang
(74) *Attorney, Agent, or Firm* — Locke Lord LLP; Tim Tingkang Xia, Esq.

(57) ABSTRACT

A correlation processing method based on observation data from the Deidou satellite includes steps of: a) collecting observation data from the BeiDou Navigation Satellite System; b) capturing data samples according to the observation data, and determining a membership degree of each data sample, and the data samples are classified; c) constructing a target classification function, and selecting the data samples to remove the unavailable data samples; and testing stationarity of each time series; d) building an observation model by using data samples having stationarity in step c), and determining correctness of the observation model and optimizing the observation model if the observation model is not correct; and e) searching a correct observation model obtained in step d) for correlation data, and performing correlation analysis of the observation data. The method of the present invention improved the quality of observation data can be effectively improved.

8 Claims, 3 Drawing Sheets ical navigation, and more particularly to a correlation processing method based on observation data from the BeiDou Navigation Satellite System (BDS).

DATA CORRELATION PROCESSING METHOD BASED ON OBSERVATION DATA FROM BEIDOU SATELLITE

CROSS-REFERENCE TO RELATED PATENT APPLICATION

This application claims priority to and the benefit of, pursuant to 35 U.S.C. § 119(a), patent application Serial No. CN201710825314.9 filed in China on Sep. 14, 2017. The disclosure of the above application is incorporated herein in its entirety by reference.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference were individually incorporated by reference.

FIELD

The present invention relates to the field of satellite navigation technology, and more particularly to a correlation processing method based on observation data from the BeiDou Navigation Satellite System (BDS).

BACKGROUND

The BDS is a global navigation satellite system autonomously developed and independently operated by China. The Chinese BDS, the American Global Positioning System (GPS), the Russian Global Navigation Satellite System (GLONASS), and the European Galileo Systems are the four core navigation satellite systems approved by the International Civil Aviation Organization (ICAO), and strive to provide high-quality navigation, positioning, and time services to users all over the world.

BDS positioning is inevitably susceptible to various errors such as ionospheric delay, troposphere delay, and multipath. Therefore, before precision positioning of the BeiDou system is implemented, it is necessary to perform a quality test and analysis of observation data from the BeiDou system, so as to mitigate and eliminate the impact of various error factors on positioning results.

To improve the overall service quality regarding precision and integrity of a navigation satellite system, the ICAO proposes the concept of a Ground-Based Augmentation System (GBAS). Under the construction of ground reference stations with known locations, GBAS not only improves the precision of satellite navigation, but also adds a series of integrity monitoring algorithms to improve indicators of system integrity, availability, and continuity, so as to provide reliable observation data and related service information to BDS users. Therefore, an airplane equipped with corresponding on-board equipments in the coverage zone of an airport obtains high-standard precision approach and landing guidance services. Regional augmentation systems such as the Ground-based Regional Integrity Monitoring System (GRIMS) for China's GNSS, the International GNSS Monitoring & Assessment System (iGMAS), the International GNSS Service (IGS), and the BeiDou Continuously Operating Reference Stations (CORS) are particularly applied to the GBAS.

However, for observation data from BeiDou satellites that is provided by the GBAS, the impact of problems that may exist in the observation data itself on data quality is often ignored. The most notable one is the correlation of the observation data, for example, channel correlation that exists when double satellites separately encounter failures, and the correlation of adjacent epochs when a single satellite encounters two failures at the same time. If an alarm fails to be raised in time for a failure that causes correlation, the observation data is affected, and reliable satellite status information cannot be provided. In this case, the safety of all users in the BDS is endangered, and the social safety and life safety are greatly jeopardized.

Therefore, to resolve the foregoing problems, a processing method based on observation data from the BDS is needed, where the processing method can perform correlation analysis of observation data from BeiDou satellites that is provided by a GBAS and improve the data quality and the service level of the BDS.

SUMMARY

An objective of the present invention is to provide a correlation processing method based on observation data from the Deidou satellite. The method includes:

a) collecting observation data from the BeiDou Navigation Satellite System;

b) capturing data samples according to the observation data, determining a membership degree of each data sample, and classifying the data samples;

c) constructing a target classification function, solving the target classification function by using Lagrange function, to convert the membership degree above into a Lagrange coefficient; selecting the data samples by using the Lagrange coefficient above to remove the unavailable data samples; and testing stationarity of each time series by using a unit root test for the selected data samples;

d) building an observation model by using data samples having stationarity in step c), and determining correctness of the observation model according to a residual series generated between an estimated value and an actual observation value of the observation model; and optimizing the observation model if the observation model is not correct; and e) searching a correct observation model obtained in step d) for correlation data, and performing correlation analysis of the observation data by building a discriminative model.

Preferably, the observation data is pseudorange observation data or carrier-phase observation data.

Preferably, the data samples are classified by using the following formula:

$(y_1, \rho_{1,1}, \mu(\rho_{1,1})), \ldots, (y_n, \rho_{n,1}, \mu(\rho_{n,1}))$, where $y_i \in \{-1, 1\}$ is a classification function, and $\mu(\rho_{i,1})$ is a membership degree of a data sample $\rho_{i,1}$, that is, a reliability degree that the data sample $\rho_{i,1}$ is a member of a class $(y_i, \rho_{i,1}, \mu(\rho_{i,1}))$.

Preferably, the data samples are selected by using the following method:

c1) assuming that $z = \varphi(x)$ is a mapping relationship of mapping a training data sample from an original pattern space $R^N$ to a high-dimensional feature space $Z$;

c2) constructing the target classification function $$\Phi(w, \xi) = \frac{1}{2}\|w\|^2 + C\sum_{i=1}^{n} \mu(\rho_{i,1})\xi_i$$

and a constraint $y_i \lfloor (w^T \cdot z_i) + b \rfloor - 1 + \xi_i \geq 0$, where $\xi_i$ is a classification error term in the target classification function, w is a weight coefficient of the classification function $y_i$, a penalty factor C is a constant, and i=1, . . . , n; and c3) defining a Lagrange function:

$$L(w, b, \xi, \alpha) = \frac{1}{2}\|w\|^2 + C\sum_{i=1}^{n} \mu(\rho_{i,1})\xi_i - \sum_{i=1}^{n} \alpha_i\{y_i[(w^T \cdot z_i) + b] - 1 + \xi_i\},$$

where $\alpha_i$ is the Lagrange coefficient;

calculating a partial derivative of the Lagrange function with respect to w,b,$\xi_i$ respectively, and substituting the partial derivative being zero into the Lagrange function to obtain a quadratic programming function with respect to the Lagrange coefficient:

$$Q(\alpha) = \sum_{i=1}^{n} \alpha_i - \frac{1}{2}\sum_{i,j=1}^{n} \alpha_i\alpha_j y_i y_j K(\rho_{i,1}, \rho_{j,1}),$$

where K is a kernel function; and
under a constraint $$\sum_{i=1}^{n} \alpha_i y_i = 0,$$

solving the Lagrange coefficient $\alpha$, corresponding to a maximum value of the quadratic programming function, where when $\alpha_i>0$, the data sample $\rho_{i,1}$ is available, or when $\alpha_i\le 0$, the data sample $\rho_{i,1}$ is unavailable.

Preferably, the kernel function is a Gaussian kernel function, and an expression of the Gaussian kernel function is:

$$K(\rho_{i,1}, \rho_{j,1}) = \exp\left(-\frac{Gamma * \|\rho_{i,1} - \rho_{j,1}\|^2}{2}\right),$$

where Gamma is the width of Gaussian distribution.

Preferably, the stationarity of each time series is tested by using a unit root test for the selected data samples by using the following formula:

a relationship $\rho_{i,1}=\gamma\rho_{i-1,1}+\varepsilon_i$ between a data sample at a moment i and a data sample at a moment i−1 is represented in a differential form as: $\Delta\rho_{i,1}=\delta\rho_{i-1,1}+\varepsilon_i$, where $\gamma$ is a coefficient, $\delta=\gamma-1$, and $\varepsilon_i$ is a noise term at the moment i; and performing OLS estimation of $\Delta\rho_{i,1}$, and calculating a statistic $$T_\delta = \frac{\hat\delta}{\hat V(\hat\delta)},$$

where $\hat\delta$ is an OLS estimate of $\delta$, and $\hat V(\hat\delta)$ is a standard difference estimate of $\hat\delta$, where when $T_\delta<\tau$, the time series of the data sample is stationary, or otherwise, the time series of the data sample is non-stationary.

Preferably, the observation model in step d) is built according to the following method:

d1) choosing a fitted observation model as: $P_t-\phi P_{t-1}- \ldots -\phi P_{t-p}=\varepsilon_t+\theta_1\varepsilon_{t-1}+ \ldots +\theta_q\varepsilon_{t-q}$, where $P=\{P_t, t=0, \pm 1, \ldots\}$ is a zero-mean stationary random sequence, and $\varepsilon=\{\varepsilon_t, t=0, \pm 1, \ldots\}$ is a white noise series whose variance is $\sigma^2$;

d2) by using the AIC criterion, searching a change range of p,q for a point (p,q) that makes a statistic F(p,q) minimal, and using the point (p,q) as an order number of the observation model;

d3) estimating unknown parameters $\phi$ and $\theta$ of the fitted observation model by using a least-squares method; and d4) substituting the parameters obtained in step d3) into the fitted observation model in step d1) to obtain the observation model.

Preferably, the correctness of the observation model is determined by using the following method:

assuming that the residual series $\{P_t-\hat P_t\}$ generated between the estimated value and the actual observation value of the observation model is a white noise series $\varepsilon$, where $P_t$ is the actual observation value of the observation model, and $\hat P_t$ is the estimated value of the observation model; and constructing a statistic $$Q_M = N\sum_{k=1}^{M} \hat R_\varepsilon^2(k),$$

where N is a data sample length, $\hat R_\varepsilon^2(k)$ is an autocorrelation coefficient of a data sample, and M equals N/10, where a given significance level $\eta$ has a critical value $\chi_\eta^2(M)$, if $Q_M>\chi_\eta^2(M)$, the assumption is false, the residual series generated between the estimated value and the actual observation value of the observation model is not a white noise series, and the observation model is incorrect, and if $Q_M<\chi_\eta^2(M)$, the assumption is true, the residual series generated between the estimated value and the actual observation value of the observation model is a white noise series, and the observation model is correct.

Preferably, the correlation analysis in step d) includes the following steps.

e1) calculating a correlation coefficient $$r = \frac{\sigma(\rho_{i,1}, \rho_{i+1,1})}{\sigma(\rho_{i,1})\sigma(\rho_{i+1,1})},$$

where $$\sigma(\rho_{i,1}, \rho_{i+1,1}) = \frac{\sum(\rho_{i,1}-\bar\rho)(\rho_{i+1,1}-\bar\rho)}{n},$$

$$\sigma(\rho_{i,1}) = \sqrt{\frac{\sum(\rho_{i,1}-\bar\rho)^2}{n}}, r \in (-1, 0, 1),$$

a mean of the observation data, and n is a total number of the data samples;

e2) building the discriminative model $$C(u, v) = \sum_{i=0}^{n} S^{-1}\left(\frac{x-\theta_{0,i}}{\theta_i}\right)\{I(Q(t_i) \le x \le Q(t_{i+1}))\}, \text{ where}$$

-continued $$x = -\log\left[\exp\left\{-\sum_{i=0}^{n}\{\theta_{0,i} + \theta_i S(u_1)\}I(t_i \le u_1 \le t_{i+1})\right\} + \exp\left\{-\sum_{i=0}^{n}\{\theta_{0,i} + \theta_i S(u_2)\}I(t_i \le u_2 \le t_{i+1})\right\}\right],$$

$$\exp\left\{-\sum_{i=0}^{n}\{\theta_{0,i} + \theta_i S(u_1)\}I(t_i \le u_1 \le t_{i+1})\right\} \text{ and}$$

$$\exp\left\{-\sum_{i=0}^{n}\{\theta_{0,i} + \theta_i S(u_2)\}I(t_i \le u_2 \le t_{i+1})\right\}$$

are generators, $Q(t_i)$ is a local polynomial of a node $t_i$, $Q(t_{i+1})$ is a local polynomial of a node $t_{i+1}$, I is a characteristic function, $\theta_i$ and $\theta_{0,i}$ are parameters of the discriminative model, u and v are random variables, $S(u_1)=-\log(-\log(u_1))$, $S(u_2)=-\log(-\log(u_2))$, and $S^{-1}$ is an inverse function of S; and e3) redefining a parameter $\beta=(\beta_0=1/\theta_0, \ldots, \beta_n=1/\theta_n)$ for the discriminative model, and estimating the redefined parameter $$\hat{\beta} = \arg\min_{\beta}(Y-P\beta)^T(Y-P\beta) + \lambda\beta^T\Delta_r^T\Delta_r\beta,$$

where Y is a fitted observation value, P is the actual observation value, $\lambda$ is a given smoothing coefficient, and r is the correlation coefficient; and analyzing correlation of the observation data according to an r-order differential between redefined adjacent parameters.

Preferably, the r-order differential between the redefined adjacent parameters is:

$\Delta_1\beta=(\beta_i-\beta_{i-1}, i=1, \ldots, n)^t$, and $\Delta_r\beta=\Delta(\Delta_{r-1}\beta)$, where when r=0, the observation data is irrelevant, when r=1, linear changes of the redefined adjacent parameters are penalized, or when r=2, quadratic changes of the redefined adjacent parameters are penalized.

In the correlation processing method based on observation data from the Beidou satellite provided in the present invention, based on BDS, GBAS application collects observation data from the BDS, classification and a stationarity test of the observation data are performed, and correlation analysis of the observation data is performed, so that the impact of noise and outliers is reduced, the credibility of the observation data is improved, and the impact of a satellite failure on the BDS can be eliminated through guidance.

It should be noted that the foregoing general description and the following detailed description are both exemplary and explanatory, and should not be used to limit the content that the present invention seeks to protect.

BRIEF DESCRIPTION OF THE DRAWINGS

More objectives, functions, and advantages of the present invention are illustrated through the following description of the implementation manners of the present invention with reference to the accompanying drawings.

DETAILED DESCRIPTION

Figure 1:
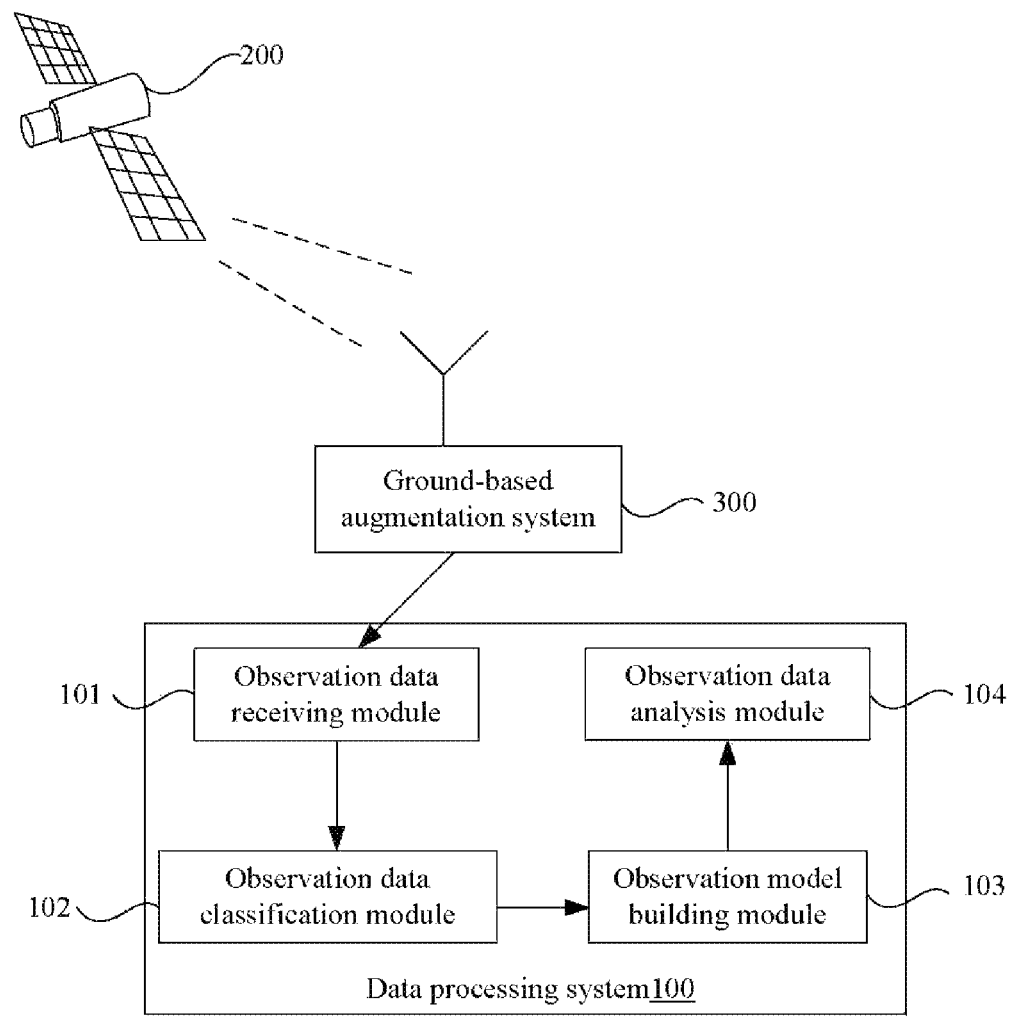
FIG. 1 is a schematic structural block diagram of a data processing system to which a data correlation processing method based on observation data from the Beidou satellite according to the present invention is applicable.

With reference to the exemplary embodiments, the objectives and functions and the methods used to implement these objectives and functions of the present invention are described. However, the present invention is not limited to the exemplary embodiments disclosed in the following. The present invention may be implemented by using different forms. The specification substantially only helps a person skilled in the art to comprehensively understand specific details of the present invention.

The embodiments of the present invention are described below with reference to the accompanying drawings. The related technical terms should be well known to a person skilled in the art. In the accompanying drawings, the same reference numerals represent the same or similar components or the same or similar steps, unless otherwise described.

The content of the present invention is described below in detail by using specific embodiments, and the source of observation data in the present invention is described first.

The GRIMS, iGMAS, IGS, BeiDou CORS, are the application of GBAS. The observation data of the present invention is not limited to the GBAS applications. Basic observation data of a navigation satellite system includes two distance observation data, that is, pseudorange observation data and carrier-phase observation data. A satellite signal received by a receiver is compared with a signal generated by the receiver itself to obtain a time difference or a phase difference, and the time difference or phase difference is further processed to obtain the distance observation data. In this embodiment, for example, pseudorange observation data is used as an example to describe the data processing method based on BDS observation data of the present invention. It should be understood that, the purpose of the present invention is not limited thereto. In some embodiments, the observation data may be carrier-phase observation data.

The pseudorange observation data is a most basic measurement value of the satellite signal by the receiver. It is assumed that at a particular moment, a satellite sends a ranging code under the control of a satellite clock and at the same time the receiver generates or duplicates a ranging code with an identical structure under the control of a receiver clock. A duplicate code generated by the receiver is delayed by one time delayer, and the delayed duplicate code is compared with the received satellite signal. If the two signals are not aligned yet, a delay time is adjusted until the two signals are aligned. In this case, the delay time of the duplicate code equals a propagation time of the satellite signal. The distance between the satellite and the earth can be obtained by multiplying the delay time by the speed of light in vacuum.

To describe the content of the present invention more clearly, first, a data processing system to which a correlation processing method based on observation data from the BDS according to the present invention is applicable is described. FIG. 1 is a structural block diagram of the data processing system to which the correlation processing method based on observation data from the BDS according to the present invention is applicable. A GBAS application 300 of the BDS receives observation data of a positioning satellite 200, and transmits the observation data to a data processing system 100 to perform data processing. The data processing system includes an observation data receiving module 101, an observation data classification module 102, an observation model building module 103, and an observation data analysis module 104.

The observation data receiving module 101 is configured to receive observation data from the BDS.

The observation data classification module 102 is configured to perform sample capturing and classification of the received observation data, and perform selection and a stationarity test of captured data samples.

The observation model building module 103 is configured to build an observation model for providing correlation data for correlation analysis of data.

The observation data analysis module 104 is configured to perform correlation analysis of the observation data.

Figure 2:
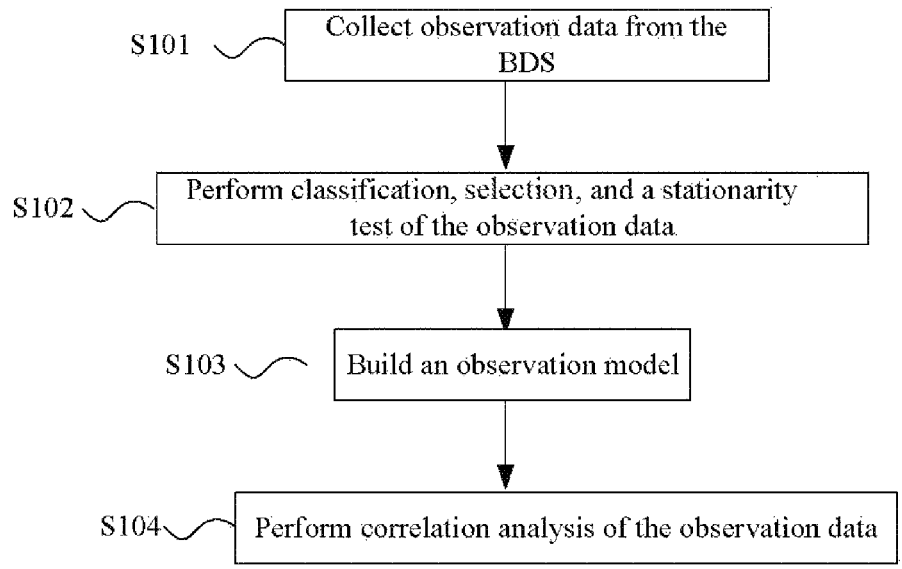
FIG. 2 is a block diagram of an overall procedure of a data correlation processing method based on observation data from the Beidou satellite according to the present invention.

FIG. 2 is a block diagram of an overall procedure of a correlation processing method based on observation data from the BDS according to the present invention. In this embodiment, the correlation processing method based on observation data from the BDS includes:

S101: Collect observation data from the BDS.

In this embodiment, pseudorange observation data at B1 frequency is used as an example. Data in 30 days is captured as samples. A time series lasts 30 seconds. There are 86400 (2880*30=86400) samples in total. In some embodiments, the observation data is carrier-phase observation data.

S102: Perform classification, selection, and a stationarity test of the observation data.

Figure 3:
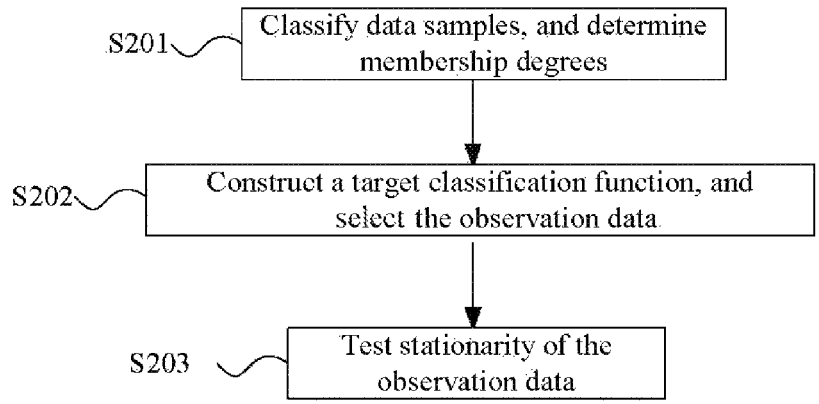
FIG. 3 is a block diagram of a procedure of performing classification, selection, and a stationarity test of observation data according to the present invention.

FIG. 3 is a block diagram of a procedure of performing classification, selection, and a stationarity test of the observation data according to the present invention. The classification, selection, and stationarity test of the observation data are performed according to the following method.

S201: Determine membership degrees.

Data samples are captured according to the observation data, and a membership degree of each data sample is determined, the data samples are classified.

The data samples are classified by using the following formula: $(y_1, \rho_{1,1}, \mu(\rho_{1,1})), \ldots, (y_n, \rho_{n,1}, \mu(\rho_{n,1}))$, where $y_i \in \{-1, 1\}$ is a classification function, and $\mu(\rho_{i,1})$ is a membership degree of a data sample $\rho_{i,1}$, that is, a reliability degree that the data sample $\rho_{i,1}$ is a member of a class $(y_i, \rho_{i,1}, \mu(\rho_{i,1}))$.

A classification radius is $$m = \frac{\max}{i} \|\rho_{i,1} - \bar{\rho}\|,$$

where $\bar{\rho}$ is a mean of the observation data. A membership degree of a data sample at each a moment is calculated by using the following formula:

$$\mu(\rho_{i,1}) = 1 - \frac{\|\rho_{i,1} - \bar{\rho}\|}{m} + \delta,$$

where $\delta > 0$ is a preset constant.

S202: Construct a target classification function, and select the observation data.

A target classification function is constructed, the target classification function is solved by using Lagrange function, to convert the membership degree above into a Lagrange coefficient; the data samples are selected by using the Lagrange coefficient above to remove the unavailable data samples. According to the present invention, the data samples are selected by using the following method:

assuming that $z = \varphi(x)$ is a mapping relationship of mapping a training data sample from an original pattern space $R^N$ to a high-dimensional feature space Z.

constructing the target classification function $$\Phi(w, \xi) = \frac{1}{2}\|w\|^2 + C\sum_{i=1}^{n} \mu(\rho_{i,1})\xi_i$$

and a constraint $y_i[(w^T \cdot z_i) + b] - 1 + \xi_i \geq 0$, where $\xi_i$ is a classification error term in the target classification function, w is a weight coefficient of the classification function $y_i$, a penalty factor C is a constant, and $i = 1, \ldots, n$; and Because an optimal solution of a target function is an optimal classification surface, to solve the target classification function, a Lagrange function is defined:

$$L(w, b, \xi, \alpha) = \frac{1}{2}\|w\|^2 + C\sum_{i=1}^{n} \mu(\rho_{i,1})\xi_i - \sum_{i=1}^{n} \alpha_i\{y_i[(w^T \cdot z_i) + b] - 1 + \xi_i\},$$

where $\alpha_i \geq 0$ is the Lagrange coefficient.

A partial derivative of the Lagrange function is calculated with respect to $w, b, \xi_i$, respectively, and the partial derivative is made zero.

$$\frac{\partial L(w, b, \xi, \alpha)}{\partial w} = w - \sum_{i=1}^{n} \alpha_i y_i z_i = 0;$$

$$\frac{\partial L(w, b, \xi, \alpha)}{\partial b} = -\sum_{i=1}^{n} \alpha_i y_i = 0; \text{ and}$$

$$\frac{\partial L(w, b, \xi, \alpha)}{\partial \xi_i} = \mu_i C - \alpha_i = 0.$$

The calculated partial derivative is substituted into the Lagrange function, and an optimal classification surface problem is transformed into a coupling problem.

According to the present invention, the calculated partial derivative is substituted into the Lagrange function to obtain a quadratic programming function with respect to the Lagrange coefficient:

$$Q(\alpha) = \sum_{i=1}^{n} \alpha_i - \frac{1}{2}\sum_{i,j=1}^{n} \alpha_i \alpha_j y_i y_j K(\rho_{i,1}, \rho_{j,1}),$$

where K is a kernel function, and preferably, in this embodiment, the kernel function is a Gaussian kernel function, and an expression of the Gaussian kernel function is:

$$K(\rho_{i,1}, \rho_{j,1}) = \exp\left(-\frac{\text{Gamma} * \|\rho_{i,1} - \rho_{j,1}\|^2}{2}\right),$$

where Gamma is the width of Gaussian distribution.

Under a constraint $$\sum_{i=1}^{n} \alpha_i y_i = 0,$$

the Lagrange coefficient $\alpha_i$ corresponding to a maximum value of the quadratic programming function is solved, where when $\alpha_i > 0$, the data sample $\rho_{i,1}$ is available, or when $\alpha_i \leq 0$, the data sample $\rho_{i,1}$ is unavailable. An unavailable data sample is deleted, so as to achieve the selection of the observation data.

S203: Test stationarity of the observation data.

In the present invention, stationarity of each time series is tested by using a unit root test for the selected data samples. Specifically, stationarity of each time series is tested by using a unit root test for the selected data samples by using the following formula.

A relationship $\rho_{i,1} = \gamma \rho_{i-1,1} + \varepsilon_i$ between a data sample at a moment i and a data sample at a moment i−1 is represented in a differential form as: $\Delta\rho_{i,1} = \delta\rho_{i-1,1} + \varepsilon_i$, where $\gamma$ is a coefficient, $\delta = \gamma - 1$, and $E_i$ is a noise term at the moment i.

OLS estimation of $\Delta\rho_{i,1}$ is performed, and a statistic $$T_\delta = \frac{\hat{\delta}}{\hat{V}(\hat{\delta})}$$

is calculated, where $\hat{\delta}$ is an OLS estimate of $\delta$, and $\hat{V}(\hat{\delta})$ is a standard difference estimate of $\hat{\delta}$, where when $T_\delta < \tau$, the time series of the data sample is stationary, or otherwise, the time series of the data sample is non-stationary.

By means of the stationarity test of the observation data, a time series is reselected for a data sample whose time series is non-stationary to ensure a stationary time series.

In the correlation processing method based on observation data from the BDS provided in the present invention, classification, selection, and a stationarity test of observation data from BeiDou satellites are performed, so that the impact of noise and outliers on data quality is reduced, and the reliability of data is ensured.

S103: Build an observation model.

Figure 4:
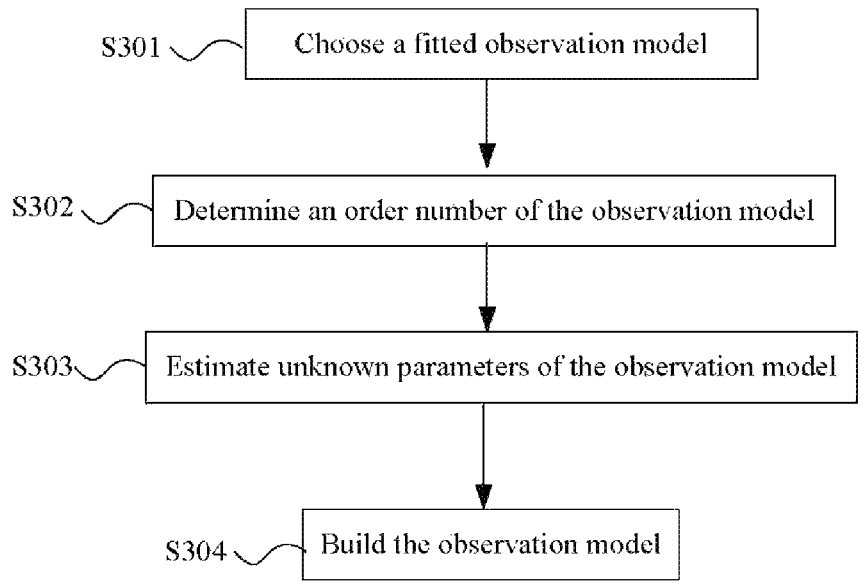
FIG. 4 is a block diagram of a procedure of building an observation model according to the present invention.

An observation model is built by using data samples having stationarity in step S102. Correctness of the observation model is determined according to a residual series generated between an estimated value and an actual observation value of the observation model. If the observation model is not correct, it will be optimized. FIG. 4 is a block diagram of a procedure of building the observation model according to the present invention. According to the present invention, the observation model is built according to the following method:

S301: Choose a fitted observation model.

Choose a fitted observation model as: $P_t - \phi P_{t-1} - \ldots - \phi P_{t-p} = \varepsilon_t + \theta_1 \varepsilon_{t-1} + \ldots + \theta_q \varepsilon_{t-q}$, where $P = \{P_t, t=0, \pm 1, \ldots\}$ is a zero-mean stationary random sequence, and $\varepsilon = \{\varepsilon_t, t=0, \pm 1, \ldots\}$ is a white noise series whose variance is $\sigma^2$.

S302: Determine an order number of the observation model.

According to the present invention, by using the AIC criterion, a change range of p,q is searched for a point (p,q) that makes a statistic F(p,q) minimal, and using the point (p,q) as an order number of the observation model. Specifically, an AIC function is defined:

$$AIC(p, q) = \min_{0 \leq m,n \leq L}(m, n) = \min_{0 \leq m,n \leq L}\left\{\ln\hat{\sigma}^2 + \frac{2(m+n)}{N}\right\},$$

where $\hat{\sigma}^2$ is an estimate of a noise term variance, L is a highest given order number, and N is the sample size of the known observation data.

S303: Estimate unknown parameters of the observation model by using a least-squares method.

In the present invention, unknown parameters $\phi$ and $\theta$ of the fitted observation model are estimated by using a least-squares method.

A residual $$\hat{\varepsilon}_t = P_t - \sum_{k}^{p} \hat{\phi}_k p_{t-k}$$

is first calculated, where $k = p+1, p+2, \ldots, N$.

An initial model of the observation model:

$$P_t = \sum_{k}^{p} \phi_k P_{t-k} + \hat{\varepsilon}_t + \sum_{k}^{q} \theta_k \hat{\varepsilon}_{t-k}, t = L+1, L+2, \ldots, N$$

is determined, where $L = \max(\hat{p}, p, q)$, and $\phi$ and $\theta$ are parameters to be determined.

A target function of the unknown parameters $\phi$ and $\theta$ is a:

$$Q(\phi, \theta) = \sum_{k=L=1}^{N}\left(P_t - \sum_{k}^{p} \phi_k P_{t-k} - \sum_{k}^{q} \theta_k \hat{\varepsilon}_{t-k}\right)^2.$$

A minimum value of the target function $$Q(\phi, \theta) = \sum_{k=L+1}^{N}\left(P_t - \sum_{k}^{p} \phi_k P_{t-k} - \sum_{k}^{q} \theta_k \hat{\varepsilon}_{t-k}\right)^2$$

is solved, to obtain a least-squares estimate: $(\hat{\phi}_1, \ldots, \hat{\phi}_p, \hat{\theta}_1, \ldots, \hat{\theta}_q)$.

A least-squares estimate of the noise term variance $\sigma^2$ is:

$$\sigma^2 = \frac{1}{N-L} Q(\hat{\phi}_1, \ldots, \hat{\phi}_p, \hat{\theta}_1, \ldots, \hat{\theta}_q).$$

A least-squares estimation method of $\phi$ and $\theta$ is:

$$P = \begin{bmatrix} \rho_{L+1} \\ \rho_{L+2} \\ \vdots \\ \rho_N \end{bmatrix}, \hat{P} = \begin{bmatrix} \rho_L & \rho_{L-1} & \cdots & \rho_{L-p+1} \\ \rho_{L+1} & \rho_L & \cdots & \rho_{L-p+2} \\ \vdots & \vdots & & \vdots \\ \rho_{N-1} & \rho_{N-2} & \cdots & \rho_{N-p} \end{bmatrix},$$

$$\hat{\varepsilon} = \begin{bmatrix} \hat{\varepsilon}_L & \hat{\varepsilon}_{L-1} & \cdots & \hat{\varepsilon}_{L-p+1} \\ \hat{\varepsilon}_{L+1} & \hat{\varepsilon}_L & \cdots & \hat{\varepsilon}_{L-p+2} \\ \vdots & \vdots & & \vdots \\ \hat{\varepsilon}_{N-1} & \hat{\varepsilon}_{N-2} & \cdots & \hat{\varepsilon}_{N-p} \end{bmatrix}, \beta = \begin{bmatrix} \phi \\ \theta \end{bmatrix}.$$

The target function of the unknown parameters $\phi$ and $\theta$ is changed to:

$Q(\phi,\theta) = |P - \hat{P}\phi - \hat{\varepsilon}\theta|^2 = |P - (\hat{P}, \hat{\varepsilon})\beta|^2$.

A least-squares estimate is solved by using simultaneous equations $(\hat{P}, \hat{\varepsilon})^T [P - (\hat{P}, \hat{\varepsilon})\beta] = 0$:

$$\begin{bmatrix} \phi \\ \theta \end{bmatrix} = \begin{bmatrix} \hat{P}^T \hat{P} & \hat{P}^T \hat{\varepsilon} \\ \hat{\varepsilon}^T \hat{P} & \hat{\varepsilon}^T \hat{\varepsilon} \end{bmatrix} \begin{bmatrix} \hat{P}^T P \\ \hat{\varepsilon}^T P \end{bmatrix}.$$

S304: Build the observation model.

The parameters $\phi$ and $\theta$ obtained in step S303 are substituted into the fitted observation model in step S301 to obtain the observation model.

According to a requirement of the present invention, the correctness of the built observation model is determined. In this embodiment, the correctness of the observation model is determined by using the following method:

assuming that the residual series $\{P_t - \hat{P}_t\}$ generated between the estimated value and the actual observation value of the observation model is a white noise series $\varepsilon$, where $P_t$ is the actual observation value of the observation model, and $\hat{P}_t$ is the estimated value of the observation model; and constructing a statistic $$Q_M = N \sum_{k=1}^{M} \hat{R}_\varepsilon^2(k),$$

where N is a data sample length, $\hat{R}_\varepsilon^2(k)$ is an autocorrelation coefficient of a data sample, and M equals N/10, where a given significance level $\eta$ has a critical value $\chi_\eta^2(M)$, if $Q_M < \chi_\eta^2(M)$, the assumption is true, the residual series generated between the estimated value and the actual observation value of the observation model is a white noise series, and the observation model is correct. Otherwise, if $Q_M > \chi_\eta^2(M)$, the assumption is false, the residual series generated between the estimated value and the actual observation value of the observation model is not a white noise series, and the observation model is incorrect. In this situation, the fitting of the observation model is relatively poor which means the observation model is incorrect, then the observation model needs to be optimized. Particularly, the observation model was optimized according to the following procedures:

analyzing and characterizing the heteroscedasticity of residuals as follows:

$$\varepsilon_t = \sigma_t L_t$$

$$\sigma_t^2 = \alpha_0 + \sum_{i=1}^{p} \alpha_i \varepsilon_{t-i}^2 + \sum_{j=1}^{q} \beta_j \sigma_{t-j}^2$$

wherein, $\{L_t\}$ is independent identically distributed sequence of random variables, p, q≥0, $\alpha_i$ and $\beta_i$ is non-negative constant, $\sigma_t^2$ is conditional variance, $\Sigma_{i=1}^{max(p,q)} (\alpha_i = \beta_i) < 1$.

The unconditional variance of $\varepsilon_t$ is:

$$D(\varepsilon_t) = \frac{\alpha_0}{1 - \sum_{i=1}^{max(p,q)} (\alpha_i + \beta_i)}.$$

S104: Perform correlation analysis of the observation data.

Figure 5:
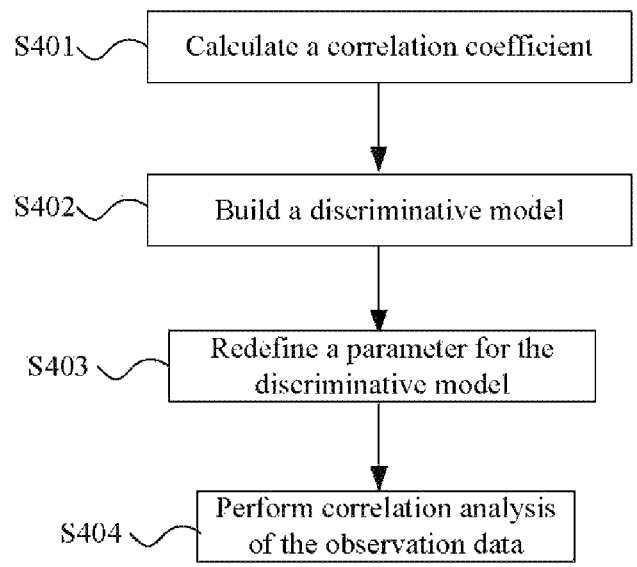
FIG. 5 is a block diagram of a procedure of performing correlation analysis of observation data according to the present invention.

A correct observation model obtained in step S103 is searched for correlation data, and correlation analysis of the observation data is performed by building a discriminative model. FIG. 5 is a block diagram of a procedure of performing correlation analysis of the observation data of the present invention. The correlation analysis includes the following steps.

S401: Calculate a correlation coefficient.

A correlation coefficient is calculated to search the observation model for correlation data, and specifically, the correlation coefficient is $$r = \frac{\sigma(\rho_{i,1}, \rho_{i+1,1})}{\sigma(\rho_{i,1})\sigma(\rho_{i+1,1})},$$

where $$\sigma(\rho_{i,1}, \rho_{i+1,1}) = \frac{\sum (\rho_{i,1} - \bar{\rho})(\rho_{i+1,1} - \bar{\rho})}{n},$$

$$\sigma(\rho_{i,1}) = \sqrt{\frac{\sum (\rho_{i,1} - \bar{\rho})^2}{n}}, r \in (-1, 0, 1),$$

$\bar{\rho}$ is a mean of the observation data, and n is a total number of the data samples.

S402: Build the discriminative model.

The discriminative model $$C(u,v) = \sum_{i=0}^{n} S^{-1}\left(\frac{x - \theta_{0,1}}{\theta_i}\right)\{I(Q(t_i) \le x \le Q(t_{i+1}))\}$$

is built, where $$x = -\log\left[\exp\left\{-\sum_{i=0}^{n} \{\theta_{0,i} + \theta_i S(u_1)\} I(t_i \le u_1 \le t_{i+1})\right\} + \exp\left\{-\sum_{i=0}^{n} \{\theta_{0,i} + \theta_i S(u_2)\} I(t_i \le u_2 \le t_{i+1})\right\}\right],$$

-continued $$\exp\left\{-\sum_{i=0}^{n} \{\theta_{0,i} + \theta_i S(u_1)\} I(t_i \le u_1 \le t_{i+1})\right\} \text{ and}$$

$$\exp\left\{-\sum_{i=0}^{n} \{\theta_{0,i} + \theta_i S(u_2)\} I(t_i \le u_2 \le t_{i+1})\right\}$$

are generators, $Q(t_i)$ is a local polynomial of a node $t_i$, $Q(t_{i+1})$ is a local polynomial of a node $t_{i+1}$, I is a characteristic function, $\theta_i$ and $\theta_{0,i}$ are parameters of the discriminative model, u and v are random variables, $S(u_1)=-\log(-\log(u_1))$, $S(u_2)=-\log(-\log(u_2))$, and $S^{-1}$ is an inverse function of S.

S403: Redefine a parameter for the discriminative model.

A parameter $\beta=(\beta_0=1/\theta_0, \ldots, \beta_n=1/\theta_n)$ is redefined for the discriminative model, and the redefined parameter $$\hat{\beta} = \underset{\beta}{\operatorname{argmin}}(Y - P\beta)^T(Y - P\beta) + \lambda \beta^T \Delta_r^T \Delta_r \beta$$

is estimated, where Y is a fitted observation value, P is the actual observation value, $\lambda$ is a given smoothing coefficient, and r is the correlation coefficient; and Correlation of the observation data is analyzed according to an r-order differential between redefined adjacent parameters.

S404: Perform correlation analysis of the observation data.

According to the present invention, in this embodiment, the r-order differential between the redefined adjacent parameters is:

$\Delta_1\beta=(\beta_i-\beta_{i-1}, i=1, \ldots, n)^t$, and $\Delta_r\beta=\Delta(\Delta_{r-1}\beta)$, where when the correlation coefficient r=0, the observation data is irrelevant, when r=1, linear changes of the redefined adjacent parameters are penalized, or when r=2, quadratic changes of the redefined adjacent parameters are penalized.

In the correlation processing method based on observation data from the BDS according to the present invention, an observation model is built, quantitative analysis of characteristics of data is performed, correlation of the observation data is analyzed, and the impact of a satellite failure on the BDS is eliminated through guidance.

In the correlation processing method based on observation data from the BDS provided in the present invention, based on BDS, GBAS application collects observation data from the BDS, classification and a stationarity test of the observation data are performed, and correlation analysis of the observation data is performed, so that the impact of noise and outliers is reduced, the credibility of the observation data is improved, and the impact of a satellite failure on the BDS can be eliminated through guidance.

With reference to the description and practice of the present invention disclose herein, other embodiments of the present invention can be easily conceived of and understood by a person skilled in the art. The description and embodiments are only considered to be exemplary, and the actual scope and theme of the present invention are defined by the claims.

What is claimed is:

1. A correlation processing method based on observation data from a BeiDou Navigation Satellite System (BDS), comprising:
    a) receiving observation data of a positioning satellite by a satellite receiver of a Ground-Based Augmentation System (GBAS) from the BDS; and the following steps executed by a data processing system:

b) capturing data samples from the observation data, and determining a membership degree of each data sample, wherein the membership degree is a reliability degree that the each data sample is a member of a class;

c) constructing a target classification function and solving the target classification function by using a Lagrange function to convert the membership degree into a Lagrange coefficient; selecting available data samples from the data samples with the Lagrange coefficient larger than zero by using the Lagrange coefficient to remove the unavailable data samples; and testing stationarity of a set of data samples at a time series lasting for a predetermined period by using a unit root test for the selected data samples;

d) building an observation model by using data samples that are stationarity in step c) in response to the testing stationarity, and determining correctness of the observation model according to a residual series, wherein when the residual series is a white noise series, the observation model is correct; and when the residual series is not the white noise series, the observation model is not correct; and optimizing the observation model if the observation model is not correct, wherein the observation model is built by d1) choosing a fitted observation model as: $P_t - \phi P_{t-1} - \ldots - \phi P_{t-p} = \varepsilon_t + \theta_1 \varepsilon_{t-1} + \ldots + \theta_q \varepsilon_{t-q}$, wherein $P=\{P_t, t=0, \pm 1, \ldots\}$ is a zero-mean stationary random sequence, and $\varepsilon=\{\varepsilon_t, t=0, \pm 1, \ldots\}$ is the white noise series whose variance is $\sigma^2$;

d2) by using the AIC criterion, searching a change range of p,q for a point (p,q) that makes a statistic F(p,q) minimal, and using the point (p,q) as an order number of the observation model;

d3) estimating unknown parameters $\phi$ and $\theta$ of the fitted observation model by using a least-squares method; and d4) substituting the parameters obtained in step d3) into the fitted observation model in step d1) to obtain the observation model;

e) searching a correct observation model obtained in step d) for the observation data, and performing a correlation analysis of the observation data by building a discriminative model, wherein the correlation analysis comprises:

e1) calculating a correlation coefficient $$r = \frac{\sigma(\rho_{i,1}, \rho_{i+1,1})}{\sigma(\rho_{i,1})\sigma(\rho_{i+1,1})},$$

wherein $$\sigma(\rho_{i,1}, \rho_{i+1,1}) = \frac{\sum (\rho_{i,1} - \bar{\rho})(\rho_{i+1,1} - \bar{\rho})}{n},$$

$$\sigma(\rho_{i,1}) = \sqrt{\frac{\sum (\rho_{i,1} - \bar{\rho})^2}{n}}, r \in (-1, 0, 1),$$

$\rho_{i,1}$ is one of the data samples of the observation data, $\bar{\rho}$ is a mean of the observation data, and n is a total number of the data samples;

e2) building the discriminative model $$C(u, v) = \sum_{i=0}^{n} S^{-1}\left(\frac{x - \theta_{0,i}}{\theta_i}\right)\{I(Q(t_i) \leq x \leq Q(t_{i+1}))\}, \text{ wherein}$$

$$x = -\log\left[\exp\left\{-\sum_{i=0}^{n} \{\theta_{0,i} + \theta_i S(u_1)\} I(t_i \leq u_1 \leq t_{i+1})\right\} + \exp\left\{-\sum_{i=0}^{n} \{\theta_{0,i} + \theta_i S(u_2)\} I(t_i \leq u_2 \leq t_{i+1})\right\}\right],$$

$$\exp\left\{-\sum_{i=0}^{n} \{\theta_{0,i} + \theta_i S(u_1)\} I(t_i \leq u_1 \leq t_{i+1})\right\} \text{ and}$$

$$\exp\left\{-\sum_{i=0}^{n} \{\theta_{0,i} + \theta_i S(u_2)\} I(t_i \leq u_2 \leq t_{i+1})\right\}$$

are generators, $Q(t_i)$ is a local polynomial of a node $t_i$, $Q(t_{i+1})$ is a local polynomial of a node $t_{i+1}$, I is a characteristic function, $\theta_i$ and $\theta_{0,i}$ are parameters of the discriminative model, u and v are random variables, $S(u_1)=-\log(-\log(u_1))$, $S(u_2)=-\log(-\log(u_2))$, and $S^{-1}$ is an inverse function of S; and e3) redefining a parameter $\beta=(\beta_0=1/\theta_0, \ldots, \beta_n=1/\theta_n)$ for the discriminative model, and estimating the redefined parameter $$\hat{\beta} = \underset{\beta}{\operatorname{argmin}}(Y - P\beta)^T(Y - P\beta) + \lambda \beta^T \Delta_r^T \Delta_r \beta,$$

wherein Y is a fitted observation value, P is the actual observation value, $\lambda$ is a given smoothing coefficient, and r is the correlation coefficient; and e4) analyzing correlation of the observation data according to an r-order differential between redefined adjacent parameters;

f) eliminating an impact of a satellite failure on the BDS through guidance in accordance with the correlation coefficient from the correlation analysis; and g) transmitting the correlation coefficient the correlation analysis from the GBAS to an airplane equipped with the BDS and the data processing system in a coverage zone of an airport obtaining a precision approach and landing guidance services.

2. The method according to claim 1, wherein the observation data is pseudorange observation data or carrier-phase observation data.

3. The method according to claim 1, wherein the data samples are classified by using the following formula:

$(y_1, \rho_{1,1}, \mu(\rho_{1,1})), \ldots, (y_n, \rho_{n,1}, \mu(\rho_{n,1}))$, wherein $y_i \in \{-1, 1\}$ is a classification function, and $\mu(\rho_{i,1})$ is a membership degree of the data sample $\rho_{i,1}$, that is, a reliability degree that the data sample $\rho_{i,1}$ is a member of a class $(y_i, \rho_{i,1}, \mu(\rho_{i,1}))$.

4. The method according to claim 1, wherein the data samples are selected by using the following method executed by the data processing system:

c1) assuming that $z=\varphi(x)$ is a mapping relationship of mapping a training data sample from an original pattern space $R^N$ to a high-dimensional feature space Z;

c2) constructing the target classification function $$\Phi(w, \xi) = \frac{1}{2}\|w\|^2 + C\sum_{i=1}^{n} \mu(\rho_{i,1})\xi_i$$

and a constraint $y_i[(w^T \cdot z_i) + b] - 1 + \xi_i \geq 0$, wherein $\xi_i$ is a classification error term in the target classification function, w is a weight coefficient of the classification function $y_i$, a penalty factor C is a constant, and $i=1, \ldots, n$; and c3) defining the Lagrange function:

$$L(w, b, \xi, \alpha) = \frac{1}{2}\|w\|^2 + C\sum_{i=1}^{n} \mu(\rho_{i,1})\xi_i - \sum_{i=1}^{n} \alpha_i \{y_i[(w^T \cdot z_i) + b] - 1 + \xi_i\},$$

wherein $\alpha_i$ is the Lagrange coefficient;

c4) calculating a partial derivative of the Lagrange function with respect to $w, b, \xi_i$ respectively, and substituting the partial derivative being zero into the Lagrange function to obtain a quadratic programming function with respect to the Lagrange coefficient:

$$Q(\alpha) = \sum_{i=1}^{n} \alpha_i - \frac{1}{2}\sum_{i,j=1}^{n} \alpha_i \alpha_j y_i y_j K(\rho_{i,1}, \rho_{j,1}),$$

wherein K is a kernel function; and c5) under a constraint $$\sum_{i=1}^{n} \alpha_i y_i = 0,$$

solving the Lagrange coefficient $\alpha_i$ corresponding to a maximum value of the quadratic programming function, wherein when $\alpha_i > 0$, the data sample $\rho_{i,1}$ is available, or when $\alpha_i \leq 0$, the data sample $\rho_{i,1}$ is unavailable.

5. The method according to claim 4, wherein the kernel function is a Gaussian kernel function, and an expression of the Gaussian kernel function is:

$$K(\rho_{i,1}, \rho_{j,1}) = \exp\left(-\frac{\text{Gamma} * \|\rho_{i,1} - \rho_{j,1}\|^2}{2}\right),$$

wherein Gamma is a Gaussian distribution width.

6. The method according to claim 1, wherein the stationarity of each time series is tested by using a unit root test for the selected data samples by using the following formula:

a relationship $\rho_{i,1} = \gamma \rho_{i-1,1} + \varepsilon_i$ between a data sample at a moment i and a data sample at a moment i−1 is represented in a differential form as: $\Delta\rho_{i,1} = \delta\rho_{i-1,1} + \varepsilon_i$, wherein $\gamma$ is a coefficient, $\delta = \gamma - 1$, and $\varepsilon_i$ is a noise term at the moment i; and performing OLS estimation of $\Delta\rho_{i,1}$, and calculating a statistic $$T_\delta = \frac{\hat{\delta}}{\hat{V}(\hat{\delta})},$$

wherein $\hat{\delta}$ is an OLS estimate of $\delta$, and $\hat{V}(\hat{\delta})$ is a standard difference estimate of $\hat{\delta}$, wherein when $T_\delta < \tau$, the time series of the data sample is stationary, or otherwise, the time series of the data sample is non-stationary.

7. The method according to claim 1, wherein the correctness of the observation model is determined by using the following method executed by the data processing system:

assuming that the residual series $\{P_t - \hat{P}_t\}$ generated between an estimated value and an actual observation value of the observation model is a white noise series $\varepsilon$, wherein $P_t$ is the actual observation value of the observation model, and $\hat{P}_t$ is the estimated value of the observation model; and constructing a statistic $$Q_M = N \sum_{k=1}^{M} \hat{R}_\varepsilon^2(k),$$

wherein N is a data sample length, $\hat{R}_\varepsilon^2(k)$ is an autocorrelation coefficient of a data sample, and M equals N/10, wherein a given significance level $\eta$ has a critical value $\chi_\eta^2(M)$, if $Q_M > \chi_\eta^2(M)$, the assumption is false, the residual series generated between the estimated value and the actual observation value of the observation model is not a white noise series, and the observation model is incorrect, and if $Q_M < \chi_\eta^2(M)$, the assumption is true, the residual series generated between the estimated value and the actual observation value of the observation model is a white noise series, and the observation model is correct.

8. The method according to claim 1, wherein the r-order differential between the redefined adjacent parameters is: $\Delta_1 \beta = (\beta_i - \beta_{i-1}, i=1, \ldots, n)^t$, and $\Delta_r \beta = \Delta(\Delta_{r-1} \beta)$, wherein when r=0, the observation data is irrelevant, when r=1, linear changes of the redefined adjacent parameters are penalized, or when r=2, quadratic changes of the redefined adjacent parameters are penalized.

* * * * *